US010131235B2

(12) United States Patent
Weidinger (10) Patent No.: US 10,131,235 B2
(45) Date of Patent: Nov. 20, 2018

(54) METHOD FOR OPERATING A CHARGING CONNECTION DEVICE FOR ELECTRIC VEHICLES (71) Applicant: KEBA AG, Linz (AT)

(72) Inventor: Gerhard Weidinger, Marchtrenk (AT)

(73) Assignee: KEBA AG, Linz (AT)

( * ) Notice: Subject to any disclaimer, the term of this patent is extended or adjusted under 35 U.S.C. 154(b) by 138 days.

(21) Appl. No.: 14/386,408

(22) PCT Filed: Apr. 9, 2013

(86) PCT No.: PCT/AT2013/050082
§ 371 (c)(1),
(2) Date: Oct. 27, 2014

(87) PCT Pub. No.: WO2013/152377
PCT Pub. Date: Oct. 17, 2013

(65) Prior Publication Data
US 2015/0054462 A1 Feb. 26, 2015

(30) Foreign Application Priority Data

Apr. 13, 2012 (DE) .................. 10 2012 103 213

(51) Int. Cl.
B60L 11/18 (2006.01)
B60L 3/04 (2006.01)
(Continued)

(52) U.S. Cl.
CPC ............ B60L 11/1816 (2013.01); B60L 3/04 (2013.01); B60L 11/187 (2013.01);
(Continued)

(58) Field of Classification Search
CPC .................... B60L 11/1816; Y02T 10/7088
(Continued)

(56) References Cited

U.S. PATENT DOCUMENTS 3,979,657 A * 9/1976 Yorksie .............. B60L 11/1862
320/136
5,668,461 A * 9/1997 Hancock .............. H02J 7/0054
320/103
(Continued)

FOREIGN PATENT DOCUMENTS

DE 10 2009 034 886 A1 2/2011
DE 10 2010 043 902 A1 5/2012
(Continued)

OTHER PUBLICATIONS

International Search Report of PCT/AT2013/050082, dated Dec. 11, 2013.

Primary Examiner — Richard Isla Rodas
Assistant Examiner — Jerry D Robbins
(74) Attorney, Agent, or Firm — Collard & Roe, P.C.

(57) ABSTRACT

A method operates a charging connection device for electric vehicles, the charging connection device including a housing inside which at least one temperature sensor constantly senses at least one temperature value. As an essential feature, the maximum permissible charging current is reduced to a specific value greater than zero if a first threshold temperature of a first temperature value is exceeded and the charging process is interrupted if the first threshold temperature has been continuously exceeded by the end of a first interval or when the at least one temperature value exceeds a second threshold temperature of the at least one temperature value. The proposed method of operating a charging connection device for electric vehicles provides for greater availability, better fault tolerance of the charging connection device while ensuring lower production costs.

14 Claims, 5 Drawing Sheets (51) Int. Cl.
*H02J 7/04* (2006.01)
*H02H 5/04* (2006.01)

(52) U.S. Cl.
CPC ....... *B60L 11/1818* (2013.01); *B60L 11/1825* (2013.01); *H02H 5/047* (2013.01); *H02J 7/047* (2013.01); *B60L 2240/549* (2013.01); *B60L 2240/662* (2013.01); *B60L 2240/80* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 6,310,465 | B2* | 10/2001 | Najima | 320/108 |
| 8,723,477 | B2* | 5/2014 | Gaul | B60L 3/0069 320/109 |
| 8,736,226 | B2* | 5/2014 | Mukai | B60L 3/0069 320/104 |
| 8,798,806 | B2* | 8/2014 | Lev | G05D 23/19 236/49.3 |
| 2004/0169489 | A1* | 9/2004 | Hobbs | B60L 3/0046 320/104 |
| 2007/0013345 | A1 | 1/2007 | Ikeda et al. | |
| 2008/0136377 | A1* | 6/2008 | Zhang | H01M 10/44 320/137 |
| 2009/0167537 | A1* | 7/2009 | Feliss | B60L 3/0069 340/584 |
| 2009/0195237 | A1 | 8/2009 | Feliss et al. | |
| 2010/0207771 | A1 | 8/2010 | Trigiani | |
| 2010/0259223 | A1 | 10/2010 | Gale et al. | |
| 2011/0074351 | A1* | 3/2011 | Bianco | B60L 11/1816 320/109 |
| 2011/0145141 | A1 | 6/2011 | Blain | |
| 2011/0149455 | A1* | 6/2011 | Ueno | B60L 3/0069 361/87 |
| 2011/0163716 | A1* | 7/2011 | Gale | B60L 3/003 320/109 |
| 2011/0191220 | A1 | 8/2011 | Kidston et al. | |
| 2011/0234159 | A1* | 9/2011 | Ohtomo | B60L 11/1816 320/109 |
| 2012/0049785 | A1* | 3/2012 | Tanaka | B60L 3/0046 320/106 |
| 2012/0206100 | A1* | 8/2012 | Brown | B60L 3/0069 320/109 |
| 2013/0193928 | A1* | 8/2013 | Prosser | H02J 7/0042 320/130 |
| 2014/0035527 | A1* | 2/2014 | Hayashigawa | B60L 11/1818 320/109 |
| 2014/0203777 | A1 | 7/2014 | Flack | |

FOREIGN PATENT DOCUMENTS

| | | |
|---|---|---|
| DE | 10 2011 009 355 A1 | 5/2012 |
| WO | 2011/127446 A2 | 10/2011 |

\* cited by examiner

METHOD FOR OPERATING A CHARGING CONNECTION DEVICE FOR ELECTRIC VEHICLES

CROSS REFERENCE TO RELATED APPLICATIONS

This application is the National Stage of PCT/AT2013/050082 filed on Apr. 9, 2013, which claims priority under 35 U.S.C. § 119 of German Application No. 10 2012 103 213.0 filed on Apr. 13, 2012, the disclosure of which is incorporated by reference. The international application under PCT article 21(2) was not published in English.

The invention relates to a method of operating a charging connection device for electric vehicles, which charging connection device comprises at least a first interface for drawing electrical energy from a stationary power supply network, at least a second interface for discharging electrical energy to an electric vehicle in a controlled manner and a housing. To this end, the second interface is preferably disposed on the housing of the charging connection device by means of a fixed plug socket or by a flexible charging cable having a plug on the free end of the charging cable. The housing of the charging connection device encloses or surrounds a plurality of electrical and electronic components, by means of which components a charging operation of the electric vehicle is controlled and monitored, and at least one temperature value in the interior of the housing is continuously detected by at least one temperature sensor so that a series of temperature measurement values for the at least one temperature sensor or the at least one temperature value is available for evaluation purposes.

Firstly, it should be pointed out that all figures relating to temperature and temperature values and temperature ranges in this document are based on the ° C. temperature scale. The same applies to percentage figures given in relation to temperature values.

Charging connection devices are known as such and are used to periodically connect an electric vehicle to a stationary power supply network so that the electrical energy of a charging device needed to charge an energy storage, in particular one or more batteries, is available. The charging device for the energy storage is typically integrated in the electric vehicle itself and, this being the case, is not a component of the charging connection device. However, designs are conceivable where the charging device of the energy storage is a constituent part of the charging connection device.

During the process of charging the electric vehicle or its energy storage, heat is generated in the charging connection device amongst others, for example due to the operation of the electrical and electronic components in the interior of the housing of the charging connection device or due to cable and transition impedance, in particular in the region of clamping points, switch contacts and plug connections, which, together with heat introduced from the ambient environment (ambient air of a specific temperature, sunlight, etc.), causes the charging connection device and its components to become hot.

If the temperature of the components of the charging connection device rises above their respective maximum permissible operating temperature, this can lead to functional faults or permanent damage to the components and hence to the charging connection device. In the event of an already existing defect of a component, for example a switch contact with a high transient impedance or a loose clamp, this can also cause excessive heat compared with fault-free operation, which can lead to serious consequential damage or even a fire if precautions are not taken in time.

Furthermore, ambient conditions such as direct sunlight, ambient air temperature, air flows or any other heat sources nearby have a considerable and varying effect on the amount of heat given off from the housing of the charging connection device.

A worst-case evaluation of all the factors affecting heating with a view to ensuring that the maximum charging power or the maximum charging current needed can be supplied by the charging connection device, even under the most unfavorable conditions, would lead to uneconomic over-dimensioning of the components and the housing of the charging connection device in the majority of situations.

To enable unacceptable heating of the charging connection device to be detected and precautions to be taken if necessary, it has been proposed, amongst other things, that the temperature in the interior of the housing of the charging connection device be monitored by means of at least one temperature sensor. In the event that an excessive temperature is detected, the standard response is for the charging operation of the electric vehicle to be cut off by the charging connection device. However, the result of this is that the energy storage of the electric vehicle is not sufficiently or fully charged and the electric vehicle cannot be used or can be so but only within a limited range when needed.

WO 2011/127446 A2 discloses a method of the generic type for operating a charging connection device for electric vehicles. In this case, the temperature prevailing in the interior of the housing is continuously detected by means of a temperature sensor and the maximum permissible charging current is re-set from a previously set initial value to a value greater than zero that is lower than this previously set initial value if a predefined threshold temperature is exceeded. These features prevent the charging operation from being interrupted prematurely. However, the resultant charging behavior is only satisfactory under certain conditions.

US 2007/0013345 A1 describes a device and a method of controlling the power supply during a charging operation. In this case, the temperature respectively prevailing in the area around the corresponding load, e.g. a battery, is detected by means of a temperature sensor. Depending on the temperature conditions prevailing in the area around the electric load, in particular the battery to be charged, and depending on a predefined time interval, the charging current intensity is switched or varied between a first current value and a second current value.

US 2009/0195237 A1 describes a device for supplying an electric load, e.g. an electric vehicle, with energy in a controlled manner. In this instance, the temperature at the current contacts of an electrical plug connection between a power supply network and a charging cable is monitored by means of a temperature sensor. If a predefined threshold temperature value is exceeded, the electric power being transferred via the co-operating cable is reduced or switched off. This is intended to prevent overheating and potential fires, in particular due to poor or high-ohm plug contacts.

Accordingly, the objective of the invention is to propose an improved method of operating a charging connection device for electric vehicles whereby greater availability and better fault tolerance can be achieved and whereby operational reliability of the charging connection device can be achieved while ensuring low production costs.

This objective is achieved by means of a method of the type outlined above, whereby if a first, lower threshold temperature of the at least one continuously detected temperature value is exceeded, the maximum permissible charging current is re-set from a previously existing initial value to a specific value that is greater than zero but lower than the initial value and the charging process is not interrupted unless a set first interval has elapsed during which the first, lower threshold temperature has been continuously exceeded or unless a second threshold temperature of the at least one continuously detected temperature value that is higher than the first threshold temperature, for example by 3° C., has been exceeded.

At this stage, it should be pointed out that, unless explicitly started otherwise, the maximum permissible charging current may also be reduced to 0 A and in terms of effect, this is tantamount to interrupting the charging operation and in terms of effect, interrupting the charging operation is tantamount to a reduction of the maximum permissible charging current to 0 A.

Accordingly, a method of operating a charging connection device for electric vehicles is proposed whereby the charging operation or process of supplying the energy storage of the electric vehicle with electrical energy is maintained for as long as possible so that the electric vehicle is sufficiently or fully charged as reliably as possible. At the same time, irrespective of the current ambient temperature and other ambient conditions, unacceptably high heating is prevented, in particular in the interior of the housing of the charging connection device, because if the first threshold temperature of the at least one temperature value is exceeded by too great a degree or for too long, the charging operation is interrupted.

Furthermore, with every reduction of the maximum permissible charging current, the start of a second interval is respectively fixed and when the second interval has elapsed, it is ascertained whether the first threshold temperature has been exceeded and if it has been exceeded, the maximum permissible charging current is further reduced, potentially to 0 A. This enables a further improvement in the availability and fault tolerance of the charging connection device to be obtained and hence a further improvement in the likelihood of the energy storage of the electric vehicle being fully charged. This applies in particular at very high ambient temperatures and if the sun is shining directly on the charging connection device. A particular advantage of this is that a major part of the dissipation or heat loss in the charging connection device occurs due to the charging current and increases and decreases as ohmic dissipation proportionally to the square of the charging current. The power transferred to the vehicle or the quantity of energy per unit of time, on the other hand, is proportional to the charging current. This means that if the charging current is reduced by the factor 0.707, the dissipation occurring is already halved ($0.707^2=0.5$), whereas the charging time is made longer by only ca. 40% ($1/0.707=1.414$). With even a relatively moderate reduction of the charging current, the dissipation which occurs is already quite considerably reduced and the total charging time made only slightly longer.

Advantageous embodiments and additional features may be found in the dependent claims and the description of the appended drawings.

It is of particular advantage in this respect if a reduction of the maximum permissible charging current or interruption of the charging operation is reversed again as soon as there is a drop below the respective threshold temperature which, having been exceeded, triggered this reduction or this interruption, by a specific tolerance value of 1° C., for example, or for the duration of a fixed third interval. This ensures that the energy storage of the electric vehicle is charged as rapidly and reliably as possible, particularly in the event of sharply fluctuating ambient temperatures or ambient conditions, thereby also continuing to guarantee operating safety. The tolerance value or third interval also prevents the charging connection device from oscillating between two maximum permissible charging current values or between activated charging operation and interrupted charging operation, which could otherwise happen due to inexact or noisy temperature measurement.

In this connection, it is also of advantage if, when a third threshold temperature of the at least one temperature value has been exceeded, which third threshold temperature is significantly above the first threshold temperature and above the optional second threshold temperature, in particular by at least 20° C., a conscious control action has to be undertaken by an operator of the charging connection device, in particular an error acknowledgement, first of all before the interruption of the charging operation is reversed. This increases the operating safety of the charging connection device because in the event of the second threshold temperature being exceeded to too great a degree and the interruption of the charging operation that goes with it, it must be assumed that there is a functional fault of the charging connection device or that the operating or ambient conditions are extremely unfavorable and automatic resumption of the charging operation must be prevented. Due to the conscious control action, the operator is required to ascertain what the basic problem is and take steps to resolve it.

It is of advantage if the respective new maximum permissible charging current is communicated to a charging device of the electric vehicle and the charging device controls or restricts the charging operation at or to this new maximum permissible charging current. This approach entails relatively little additional complexity because the charging device and charging electronics for charging the energy storage are provided in the electric vehicle as standard in any case.

It is also of advantage if the at least one temperature sensor detects the at least one temperature value continuously in the interior of the housing in the region of a circuit board, which circuit board incorporates at least a majority of the electrical and electronic components of the charging connection device, and the at least one temperature sensor is preferably positioned adjacent to a central control unit of the charging connection device, which central control unit controls the other electrical and electronic components and communicates with them. In this manner, the electrical and electronic components that are the most sensitive in terms of the temperature being exceeded, in particular the semiconductor components of the central control unit (microcontroller) for example, are best protected against overheating because the temperature directly adjacent to or at these components is continuously detected.

Furthermore, it is of advantage if a reduction of the maximum permissible charging current or an interruption of the charging operation is signaled to an operator of the charging connection device by acoustic, visual and/or computer means, i.e. for example by a mobile phone message (SMS) or an E-mail. This ensures that the operator receives timely and comprehensive information about the current situation to enable a longer charging time of the electric vehicle to be set or even precautions to be taken, for example.

It is of advantage if the respective threshold temperature of the at least one temperature value is determined by means of one or more reference measurements so that below the respective threshold temperature, the permissible maximum operating temperatures of selected electrical and electronic components of the charging connection device are not exceeded. To this end, the typical temperature distribution inside the housing and the typical temperature of selected components are determined as a ratio of the at least one temperature value and the highest permissible operating temperatures of these components are used to determine the threshold temperature for the at least one temperature value. This ensures that the respective threshold temperature is set at the most suitable level possible level so as to obtain the highest possible availability and fault tolerance on the one hand and guarantee operating safety at all times. Setting absolutely accurate threshold temperatures in this manner also results in the longest possible service life of the electrical and electronic components.

It is also of advantage if the at least one temperature value continuously detected by the at least one temperature sensor is subjected to a trend analysis so that an early reduction of the maximum permissible charging current or an early interruption of the charging operation can be implemented in the event of a critical result of the trend analysis, and a reduction of the maximum permissible charging current or an interruption of the charging operation can be prevented or reversed at an early stage in the event of a non-critical result of the trend analysis. This further increases availability or fault tolerance, the effectiveness of the charging operation and the operating safety of the charging connection device because the requisite measures or precautions can be initiated early if there is a threat of an excessive temperature but are not initiated at all or reversed early if the situation is not actually critical or there are no longer circumstances indicating an impending excessive temperature.

It is also of advantage if the degree of the decrease or optionally increase of the maximum permissible charging current, i.e. the speed of the temperature increase or temperature decrease, of the at least one temperature value in the vicinity region of the first threshold temperature is determined and set based on the current or optionally predicted degree of the rate of change in a trend analysis. This being the case, the reduction has all the more impact, the higher the rate of increase of the at least one temperature value is (or is predicted to be) and the increase has all the more impact the higher the rate of reduction of the at least one temperature value is (or is predicted to be). This feature makes it possible to derive to what extent the dissipation in the charging connection device is above the quantity of heat given off to the outside and hence to what extent the charging current needs to be reduced in order to obtain a balanced and as stationary as possible operation in the vicinity of the threshold temperature. This ensures particularly efficient and safe operation of the charging connection device.

It is also of advantage if a venting unit of the charging connection device can be activated if there is a reduction of the maximum permissible charging current, an interruption of the charging operation and/or optionally a critical result of the trend analysis of the at least one temperature value, i.e. when it is likely that the respective threshold temperature will be exceeded. This results in a further increase in the availability or fault tolerance and operating safety of the charging connection device, especially in the case of a trend analysis, because the electrical and electronic components are actively cooled by the venting unit (at an early stage). Furthermore, any noise generated is kept low because it is restricted to only periods where forced cooling is necessary and the service life of the venting unit is made decisively longer.

It is of particular advantage if at least one other temperature value at or in the at least one second interface of the charging connection device is continuously detected by at least one other temperature sensor and this at least one other temperature value is monitored to ascertain whether at least one other threshold temperature is exceeded. This enables a neural region of the charging connection device to be directly involved in monitoring the temperature, thereby increasing availability or fault tolerance and operating safety. Especially the region of the at least one second interface for controlling the output of electrical energy to the electric vehicle, which interface in particular comprises a plug socket on the housing of the charging connection device or a flexible charging cable with a plug on its free end for the co-operating plug socket on the electric vehicle, there is a possibility of heat being generated due to transition impedance between the contacts of the plug socket and the corresponding plug. This situation is also exacerbated with increasing age and with a rising degree of wear of such a plug connection.

It is of advantage if several temperature values, preferably at different measuring positions in the interior of the housing, are continuously detected by several temperature sensors. On this basis, depending on the number and distribution of the temperature sensors, the most comprehensive and gap-free temperature monitoring system can be assured for the charging connection device.

It is also of advantage if another temperature value at or in the power supply is continuously detected by another temperature sensor, which power supply supplies at least the majority of electrical and electronic components of the charging connection device with electrical energy, and if another threshold temperature of this other temperature value is exceeded, the charging operation is terminated and the charging connection device is deactivated by switching off the power supply. In the event of a fault, this reduces the heat generated in the charging connection device itself to a minimum so that in the event of such a fault, the lowest possible temperature occurs in the interior of the housing of the charging connection device. This increases the operating safety of the charging connection device as a result. The operating safety is also increased as a result because a functionally independent, i.e. separate, effective temperature monitoring system can contribute to a safe shutdown, which independent temperature monitoring system also functions if the normal temperature monitoring system, controlled in particular by software and a processor, is malfunctioning.

Finally, it is also of advantage if a log is kept of every time a threshold temperature is exceeded and/or every time there is subsequently a drop below it, preferably in conjunction with other operating events and in particular with an absolute or relative time stamp. This enables a thorough and comprehensive function control and function optimization of the charging connection device to be run during normal operation and a diagnosis of the charging connection device to be run in the event of faults, especially documenting when the respective threshold temperature is exceeded.

To provide a clearer understanding, the invention will be described in more detail below with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
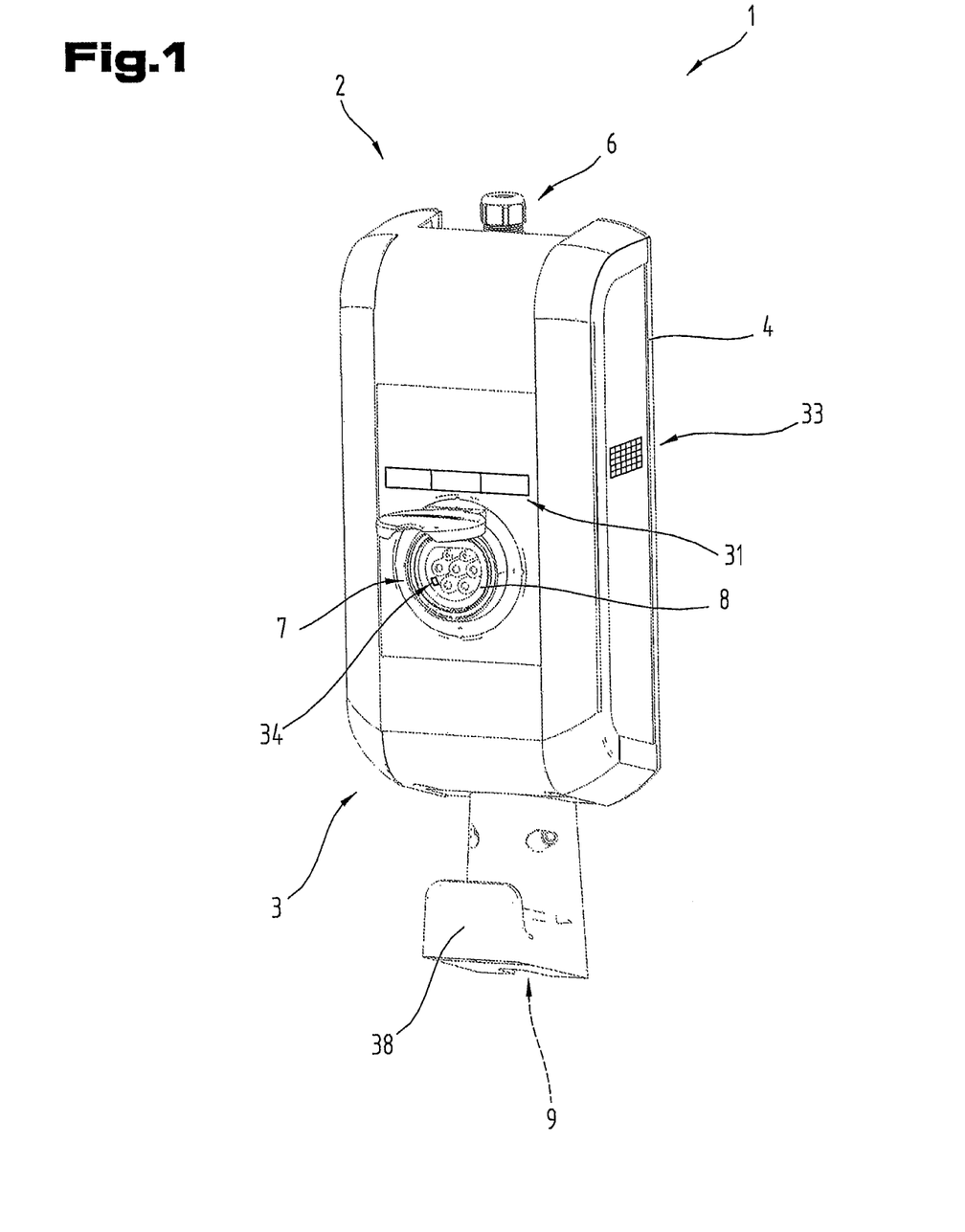
FIG. 1 a perspective view looking towards the housing front face illustrating an embodiment of the charging connection device.
Figure 2:
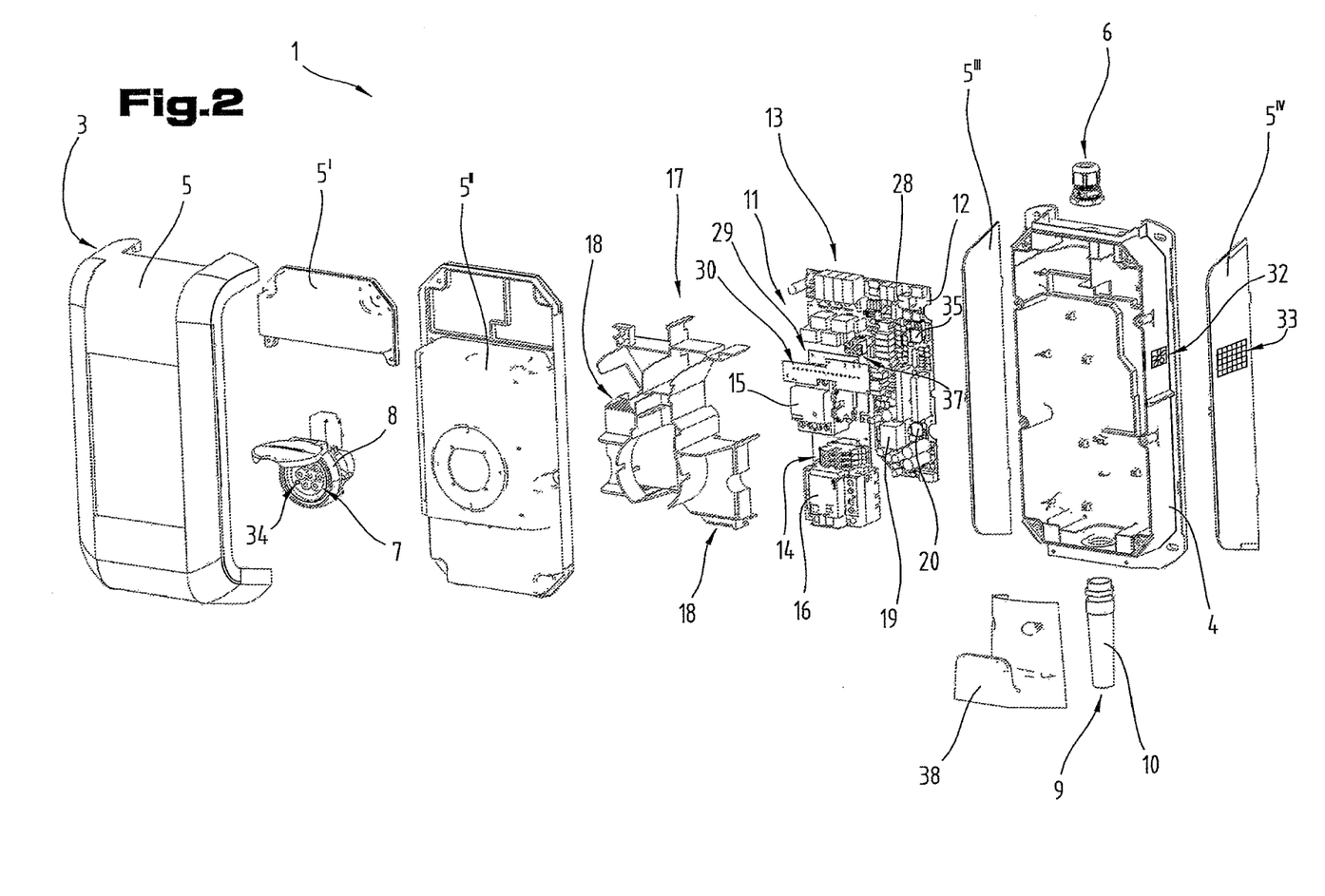
FIG. 2 an exploded diagram of the charging connection device illustrated in FIG. 1.
Figure 3:
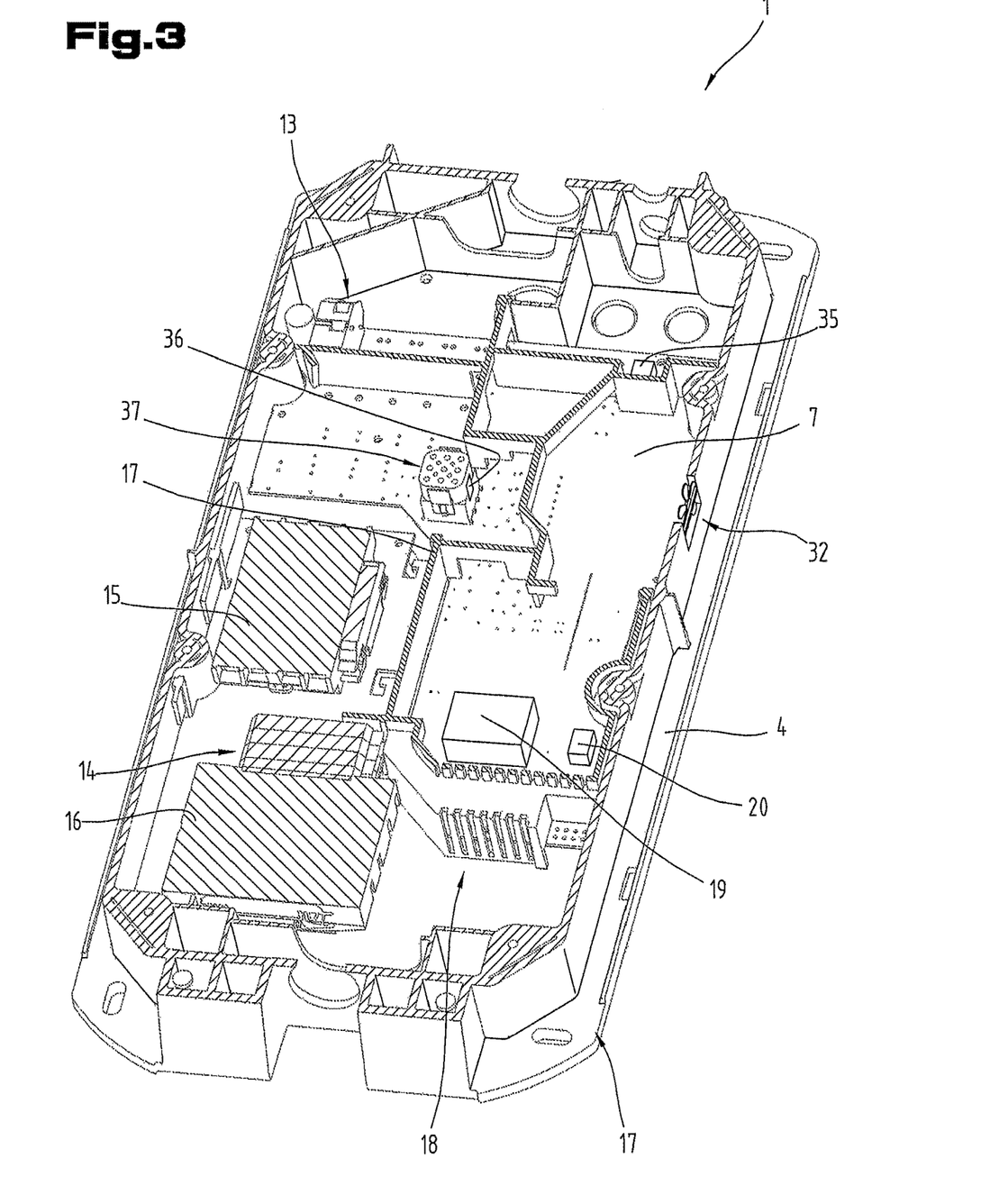
FIG. 3 a diagram showing the charging connection device illustrated in FIG. 1 opened and in longitudinal section.

FIGS. 1 to 3 illustrate an exemplary embodiment of a charging connection device 1 for electric vehicles. This charging connection device 1 is provided as a means of charging or regenerating an energy storage, in particular one or more batteries, of an electric vehicle, and the charging connection device 1 constitutes the connecting element between a stationary power supply network and a charging device of the energy storage of the electric vehicle. The charging device of the energy storage may be designed as a constituent part of the charging connection device 1, although in currently standard designs, the charging device is preferably integrated in the electric vehicle itself. The charging connection device 1 then constitutes a type of intelligent power charging point for electric vehicles.

The charging connection device 1 illustrated comprises a housing 2, which in turn comprises a front housing part 3 and a rear housing part 4, and the rear housing part 4 is stationary, for example mounted on a house wall or a pillar, and the front housing part 3 can be removed from the rear housing part 4 if necessary. In the embodiment illustrated as an example here, the front housing part 3 comprises several other housing parts 5 to 5$^{IV}$.

Disposed on a top face of the housing 2 is a first interface 6 for drawing electrical energy from the stationary power supply network. The charging connection device 1 draws electrical energy from the power supply network via this first interface 6, and in the embodiment illustrated as an example here, the first interface 6 is a hard-wired cable interface. To enable the electrical power typically needed to be transferred into the charging connection device 1 and from there onwards to the electric vehicle, electric cables with a cable cross-section of at least 4 mm$^2$ are provided.

In order to output the electrical energy to the electric vehicle, at least one second interface 7 is provided on a front face of the housing 2. This second interface 7 comprises a plug socket 8 into which a plug of a charging cable of the electric vehicle can be plugged and locked. In the charging connection device 1 illustrated here, another second interface 9 is provided on a bottom face of the housing 2, to which a wired, flexible charging cable can be fixedly connected to the charging connection device 1, a plug being provided on the free end of the flexible charging cable which can be plugged into a co-operating plug socket on the electric vehicle. A co-operating charging cable output 10 for the flexible charging cable of the other second interface 9 may be seen in FIG. 2. Which of the embodiments of the second interface 7, 9 is then actually provided on the charging connection device and whether one or more second interfaces 7, 9 are provided is a matter which may be decided depending on requirements. In one embodiment of the at least one second interface 7, 9 in the form of a flexible charging cable, a charging cable holder 38 is expediently provided, on which the flexible charging cable can be stowed when not in use.

As may best be seen from FIGS. 2 and 3, the housing 2 or the front housing part 3 and rear housing part 4 enclose a plurality of electrical and electronic components in the interior of the housing 2, which electrical and electronic components 11 are disposed or secured on a circuit board 12 and which control and monitor the charging operation of the electric vehicle, amongst other things. During the course of controlling and monitoring the charging operation, it is also necessary for various measurements to be taken, for example in order to determine the current intensity of the current transferred to the electric vehicle. The electrical and electronic components 11 needed for this purpose are also provided on the circuit board 12.

The electrical and electronic components 11 also include in particular connecting terminals 13 for connecting the wires of the first interface 6 to the charging connection device 1, connecting terminals 14 for connecting the wires of the second interface 7 and the other second interface 9 to the charging connection device 1, an electrical relay 15 for establishing and cutting off the electrical connection between the first interface 6 and the second interface 7 or the other second interface 9 of the charging connection device 1, optionally a residual-current circuit breaker 16 which cuts off the power circuit in a ground in the power supply network from the charging connection device 1 to the electric vehicle and a central control unit 19 which controls the other electrical and electronic components 11 and communicates with them, preferably provided in the form of a microcontroller.

The circuit board 12 with the electrical and electronic components 11 mounted on it is secured in a base region in the interior of rear housing part 4. A molded part 17 made from plastic is disposed between a front face of the circuit board 12 and electrical and electronic components 11 and the other housing part 5$^{II}$ of front housing part 3 of the housing 2, which molded part 17 supports the other housing part 5$^{II}$ with respect to the circuit board 12 and rear housing part 4, as may best be seen from FIG. 3, and splits or sub-divides the circuit board 12 and the electrical and electronic components 11 disposed on it into different regions. In order to ensure that there is an adequate air circulation for cooling the interior of the housing 2, the molded part 17 is provided with air vents 18 at various points.

In order to monitor the temperature in the interior of the housing 2 of the charging connection device 1, at least one temperature sensor 20 is disposed in a specific position in the housing 2 for continuously detecting at least one temperature value. In the embodiment illustrated as an example here, the at least one temperature sensor 20 is positioned in the region of the circuit board 12, adjacent to the central control unit 19 of the charging connection device 1 so that the current temperature in this region and adjacent to this sensitive component can be directly detected and monitored.

Figure 4:
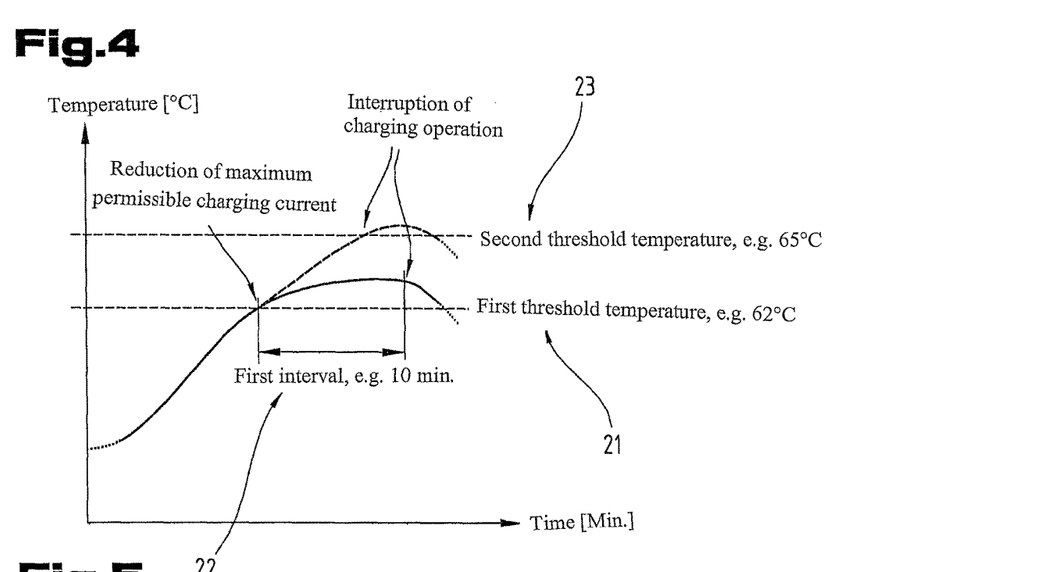
FIG. 4 exemplary graphs plotting temperature over time with a diagram of the method steps run by a first group of embodiments of the charging connection device from FIG. 1.
Figure 5:
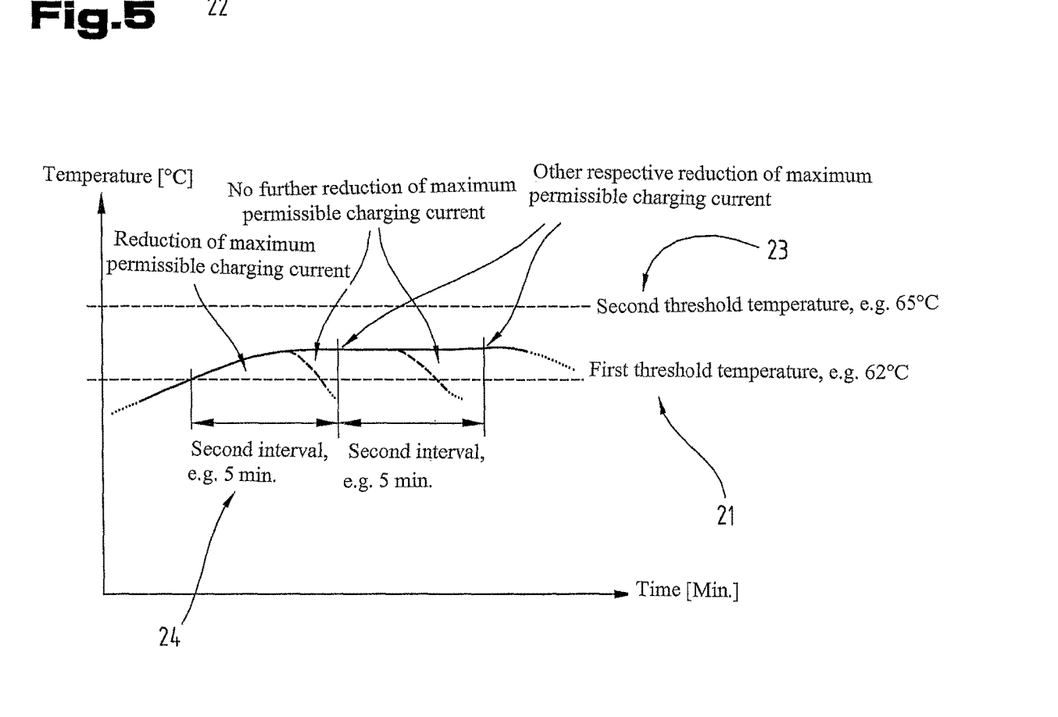
FIG. 5 other exemplary graphs plotting temperature over time with a diagram of the method steps run by another embodiment of the charging connection device from FIG. 1 and FIG. 6 other exemplary graphs plotting temperature over time with a diagram of the method steps run by another group of embodiments of the charging connection device from FIG. 1.
Figure 6:
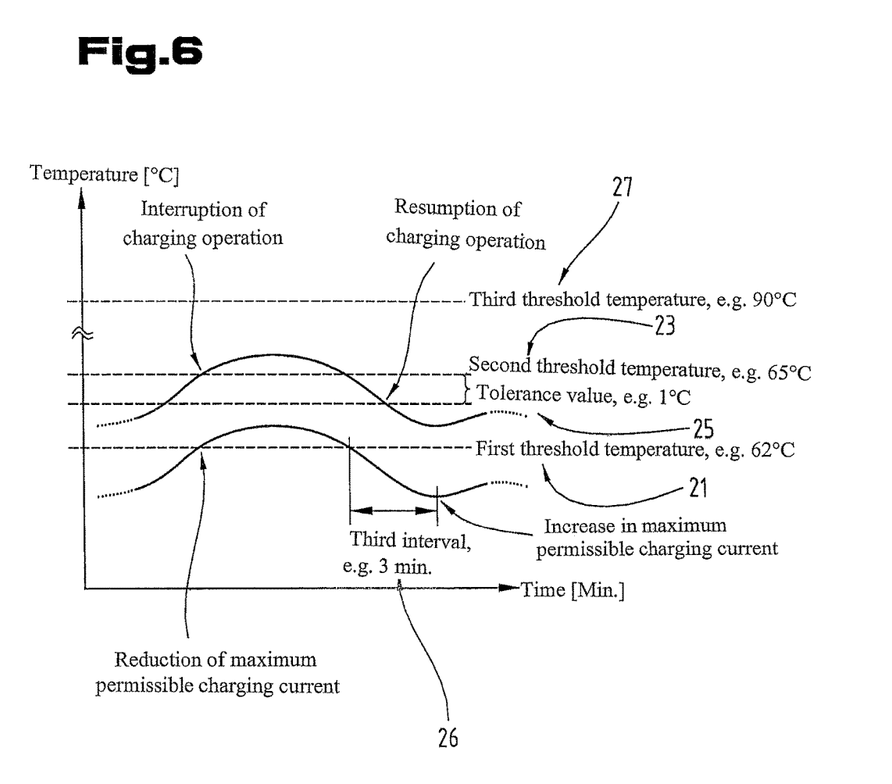

FIGS. 4 to 6 illustrate how the charging connection device 1 reacts to different curves plotting the at least one temperature value in the interior of the housing 2 continuously detected by the at least one temperature sensor 20.

As illustrated in FIG. 4, a first threshold temperature 21 of 62° C., for example, is defined for the at least one temperature value. As long as the continuously detected temperature value lies below this first threshold temperature 21, a specific maximum permissible charging current of 32 A, for example, is predefined by this charging connection device 1. If the first threshold temperature 21 of the at least one temperature value is exceeded, the maximum permissible charging current is reduced from the previously existing initial value to a specific value of 16 A, for example, that is lower than the initial value. Based on a first embodiment of the method, together with this reduction in the maximum permissible charging current, the start of a first interval 22 of 10 minutes, for example, is set and if this first interval 22 elapses and the first threshold temperature 21 has been continuously exceeded, the charging operation is interrupted.

Based on a second, alternative embodiment or additional feature of the method, a second threshold temperature 23 of the at least one temperature value that is higher than the first threshold temperature 21 is defined, for example 65° C. If, after the first threshold temperature 21 has been exceeded and the maximum permissible charging current has been reduced as a result and then also the higher second threshold temperature 23 is exceeded, the charging operation is interrupted at this instant.

If setting a reduced maximum permissible charging current does not have any demonstrable effect, for example because the charging device of the electric vehicle does not react to the reduction in the maximum permissible charging current, the charging operation is preferably not interrupted straight away but is continued until one of the interruption conditions mentioned above is satisfied so that the charging operation is maintained for as long as possible.

Based on another variant of the method illustrated on the basis of a graph in FIG. 5, with every reduction in the maximum permissible charging current the start of a second interval 24 of 5 minutes, for example, is set in each case. When this respective second interval 24 has elapsed, it is then ascertained whether the first threshold temperature 21 is still being exceeded. If this is the case, the maximum permissible charging current is further reduced, for example to 10 A. If, on the other hand, when the second interval 24 has elapsed the first threshold temperature 21 is no longer being exceeded, no further reduction is made to the maximum permissible charging current.

In this connection, it should be pointed out that a further reduction in the maximum permissible charging current also includes the situation in which the maximum permissible charging current is reduced to 0 A. It should also be noted that the additional feature of the method illustrated in FIG. 5 is employed independently of the embodiment of the method described in connection with FIG. 4. An interruption of the charging operation is therefore still triggered if the second threshold temperature 23 of the at least one temperature value is exceeded.

FIG. 6 is a graph illustrating another embodiment of the method, whereby a reduction of the maximum permissible charging current or an interruption of the charging operation is reversed again as soon as the respective threshold temperature 21, 23 which caused this reduction or this interruption because it was exceeded is then not exceeded by a specific tolerance value 25 of 1° C., for example, or for a fixed third interval 26 of 3 minutes, for example. In this respect, it should be pointed out that in FIG. 6, these two aspects of the method for the two threshold temperatures 21, 23 are illustrated by way of example only. It would naturally also be possible for the respective threshold temperature 21, 23 to be used in conjunction with the other aspect of the method (tolerance value 25 or third interval 26) or for the same aspect of the method to be used for both of the threshold temperatures 21, 23 respectively.

FIG. 6 also shows a third threshold temperature 27 of 90° C., for example, and this third threshold temperature 27 lies significantly above the first threshold temperature 21 and optionally above the second threshold temperature 23, in particular by at least 20° C. Based on another embodiment of the method, when the third threshold temperature 27 of the at least one temperature value is exceeded, it is necessary for a conscious control action to be undertaken, in particular an error acknowledgement, by an operator of the charging connection device 1 before the interruption of the charging operation is reversed again if necessary, i.e. when the second threshold temperature 23 has been exceeded by a sufficient degree or for a sufficiently long interval. The fact that the second threshold temperature 23 is exceeded by the massive degree defined by the third threshold temperature 27 and the charging operation is interrupted as a result means that it can be assumed that there is a functional fault on the charging connection device or that the ambient conditions are extremely unfavorable, in which case automatic resumption of the charging operation is prevented.

It is of practical advantage if the newly determined, i.e. reduced or increased, maximum permissible charging current on a charging device of the electric vehicle and its energy storage is communicated in each case as part of the embodiment of the method used and the charging device controls or limits the charging operation on the basis of this new maximum permissible charging current. To this end, the charging connection device 1 is provided with a communication interface 28 by means of which, amongst other things, the communication between the charging connection device 1 and the electric vehicle to be charged takes place. In particular, this communication is hard-wired via the charging cable, which is connected to the at least one second interface 7, 9 of the charging connection device 1 and at the other end to the co-operating interface of the electric vehicle. In this connection, however, it would also be conceivable to opt for other communication systems, for example a wireless communication by means of an electromagnetic signal.

The communication interface 28 may also enable the charging connection device 1 to communicate with other devices, for example a remote or external control device for the charging connection device 1 or a central management device for a plurality of charging connection devices 1. This communication may also be operated via the Internet.

The charging connection device 1 is also expediently provided with an output element 29 comprising one or more lamp means 30, which output element 29 is used to display a visual signal in a display area 31—FIG. 1—on the front face of the housing 2 of the charging connection device 1 so that a reduction in the maximum permissible charging current or an interruption of the charging operation can be visually indicated to an operator of the charging connection device 1. In this connection, it would also be conceivable for such an indication to be given additionally or exclusively by acoustic means, for example, via another output element and/or on a computer means via the communication interface 28. By indication on a computer means is meant the transmission of a mobile phone message or an E-mail to the operator, for example.

The reduction in the charging current and the interruption of the charging operation may also be indicated on the remote or external control device for the charging connection device 1 or the central management device for a plurality of charging connection devices 1, where it is visually or acoustically output or displayed.

It is also of practical advantage if the respective threshold temperature 21, 23, 27 of the at least one temperature value is determined in advance by means of one or more reference measurements so that below the respective threshold temperature 21, 23, 27, the permissible, maximum operating temperatures of selected electrical or electronic components 11 of the charging connection device 1 are not exceeded. In other words, specifically for the specific position or disposition of the at least one temperature sensor 20, the respective threshold temperature 21, 23, 27 is determined taking account of the permissible, maximum operating temperatures of selected, in particular sensitive, electrical and electronic components 11, such as for example the central control unit 19, during the course of the at least one reference measurement.

It is of particular practical advantage if the at least one temperature value continuously detected by the at least one temperature sensor 20 is subjected to a trend analysis. Using such a trend analysis, the current level of the temperature value or the current rate of change or change in direction of the temperature value is used to make an estimate or prediction as to how the at least one temperature value will develop in terms of value in the in the period immediately ahead. A result of such a trend analysis is, for example, whether or with what likelihood the at least one temperature value will rise above or drop below one of the threshold temperatures 21, 23, 27 at a specific point in time in the future, by what amount this rise or fall will be and/or for how long this rise or fall will last.

Using the result of the trend analysis of the at least one temperature value, it is then possible to apply a reduction in the maximum permissible charging current at an early stage or interrupt the charging operation at an early stage if the result of the trend analysis predicts that the first threshold temperature 21 or the second threshold temperature 23 will be exceeded. It is also possible to prevent a reduction in the maximum permissible charging current or an interruption of the charging operation if it is obvious from the result of the trend analysis that the first threshold temperature 21 or the second threshold temperature 23 will be exceeded for a specific, sufficiently short interval and/or by a sufficiently low amount. It is also possible to reverse a reduction in the maximum permissible charging current or an interruption of the charging operation at an early stage if warranted by the result of the trend analysis.

It is also of practical advantage, especially in conjunction with a trend analysis, to determine and set the amount of the reduction or optionally increase in the maximum permissible charging current on the basis of the current or optionally the predicted degree of the rate of change, i.e. speed of the temperature increase or temperature decrease, of the at least one temperature value in the vicinity of the first threshold temperature 21. The change in speed of the temperature in the vicinity of the first threshold value offers a starting point for the required or necessary amount of change in the charging current with a view to obtaining as stationary operation as possible in the vicinity of the threshold temperature for an optimum charging current.

As may be seen from FIGS. 1 to 3, the charging connection device 1 is provided with a venting unit 32 with a ventilation grille 33 mounted externally upstream in the other housing part $5^{III}$ of the front housing part 3 of the housing 2. This venting unit 32 may be activated in the event of a reduction of the maximum permissible charging current, in the event of an interruption of the charging operation and/or if necessary in the event of a corresponding result of the trend analysis of the at least one temperature value, i.e. if it is likely that the respective threshold temperature 21, 23, 27 will be exceeded, in order to generate a cooling air flow in the interior of the housing 2, in particular in the region of the circuit board 12, in order to cool the electrical and electronic components 11 and disperse the thermal energy prevailing in the interior of the housing 2 to the outside.

In the described embodiment of the charging connection device 1, the plug socket 8 of the at least one second interface 7 of the charging connection device 1 is provided with at least one other temperature sensor 34, by means of which other temperature sensor 34 at least one other temperature value is continuously detected. This at least one other temperature value is monitored to ascertain whether at least one other threshold temperature is exceeded in the same way as above in the case of the system monitoring the at least one temperature value of the at least one temperature sensor 20. How this monitoring is implemented and what measures and precautions are derived from the results of monitoring may be found in the parts of the description given above. For reasons of efficiency, this description will not be repeated here.

It is also of practical advantage to detect the temperature in the interior of the housing 2 continuously with several temperature sensors 20, 35, 36 at different measuring positions. As a result of this feature, it is possible in particular to detect and evaluate different temperatures in different regions in the interior of the housing 2 independently of one another.

As may be seen from FIG. 3, another temperature sensor 36 is mounted on a power supply 37 of the charging connection device 1 for continuously detecting another temperature value. This power supply 37 is mounted on the circuit board 12 and supplies at least the majority of the electrical and electronic components 11 of the charging connection device 1 with electrical energy. If the other temperature sensor 36 detects that another threshold temperature has been exceeded, the charging operation is terminated and the charging connection device 1 is deactivated by switching off the power supply 37. In particular, this temperature monitoring system operates independently of the temperature monitoring system operated by means of the other temperature sensors 20, 34, 35.

One of the electrical and electronic components 11 or a component of the central control unit 19 of the charging connection device 1 advantageously serves as an electronic storage element in which data can be logged or stored every time there is a rise above and/or every time there is a drop below a threshold temperature 21, 23, 27, preferably along with other events occurring during operation of the charging connection device 1 and in particular provided with an absolute or relative time stamp.

For the sake of good order, finally, it should be pointed out that, in order to provide a clearer understanding of the structure of the charging connection device 1, it and its constituent parts are illustrated to a certain extent out of scale and/or on an enlarged scale and/or on a reduced scale.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible variants of the method of operating the charging connection device 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

Above all, the individual embodiments of the subject matter illustrated in FIGS. 1 to 3; 4; 5; 6 constitute independent solutions proposed by the invention in their own right. The objectives and associated solutions proposed by the invention may be found in the detailed descriptions of these drawings.

| List of reference numbers | |
|---|---|
| 1 | Charging connection device |
| 2 | Housing |
| 3 | Front housing part |
| 4 | Rear housing part |
| 5-5$^{IV}$ | Other housing parts |
| 6 | First interface |
| 7 | Second interface |
| 8 | Plug socket |
| 9 | Second interface |
| 10 | Charging cable output |
| 11 | Electrical and electronic components |
| 12 | Circuit board |
| 13 | Connecting terminals |
| 14 | Connecting terminals |
| 15 | Electrical relay |
| 16 | Residual-current circuit breaker |
| 17 | Molded part |
| 18 | Venting orifices |
| 19 | Central control unit |
| 20 | Temperature sensor |
| 21 | First threshold temperature |
| 22 | First interval |
| 23 | Second threshold temperature |
| 24 | Second interval |
| 25 | Tolerance value |
| 26 | Third interval |
| 27 | Third threshold temperature |
| 28 | Communication interface |
| 29 | Output element |
| 30 | Lamp means |
| 31 | Display area |
| 32 | Venting unit |
| 33 | Ventilation grille |
| 34 | Temperature sensor |
| 35 | Temperature sensor |
| 36 | Temperature sensor |
| 37 | Power supply |
| 38 | Charging cable holder |

The invention claimed is:

1. A method of operating a charging connection device for electric vehicles, the charging connection device comprising at least a first interface for drawing electrical energy from a stationary power supply network,
at least one second interface for discharging electrical energy to an electric vehicle in a controlled manner, and
a housing, which housing encloses a plurality of electrical and electronic components,
wherein the electrical and electronic components control and monitor a charging operation of the electric vehicle,
wherein the at least one second interface is embodied by
a plug socket on the housing into which plug socket a plug of a charging cable of an electric vehicle can be plugged, or
a flexible charging cable fixedly connected to the housing of the charging connection device, wherein the flexible charging cable is provided on a free end of the flexible charging cable with a plug which can be plugged into a cooperating plug socket on an electric vehicle, or
a plug socket on the housing into which plug socket a plug of a charging cable of an electric vehicle can be plugged, and a flexible charging cable fixedly connected to the housing of the charging connection device, wherein the flexible charging cable is provided on a free end of the flexible charging cable with a plug which can be plugged into a cooperating plug socket on an electric vehicle,
wherein at least one temperature value in the interior of the housing is continuously detected by at least one temperature sensor, and when a first threshold temperature of the at least one temperature value is exceeded, a maximum permissible charging current is set from a previously existing initial value to a specific value that is greater than zero but lower than the initial value,
wherein the charging operation is interrupted when a fixed first interval during which the first threshold temperature has been continuously exceeded has elapsed, the fixed first interval being started with the reduction of the maximum permissible charging current,
wherein with a first or a further reduction of the maximum permissible charging current the start of a second interval is respectively set and when the second interval has elapsed, it is ascertained whether the first threshold temperature has been exceeded and if it has been exceeded, the maximum permissible charging current is further reduced,
wherein the second interval is shorter than the first interval, and
wherein the respective new, maximum permissible charging current is communicated to a charging device in the electric vehicle and the charging device in the electric vehicle controls or limits the charging operation on the basis of this new, maximum permissible charging current.

2. The method according to claim 1, wherein the charging operation is interrupted if a second threshold temperature of the at least one temperature value higher than the first threshold temperature has been exceeded.

3. The method according to claim 1, wherein a reduction of the maximum permissible charging current or an interruption of the charging operation is reversed again as soon as there is a drop below the respective threshold temperature which, having been exceeded triggered this reduction or this interruption, by a specific tolerance value or for a fixed third interval.

4. The method according to claim 3, wherein when a third threshold temperature of the at least one temperature value is exceeded, which third threshold temperature lies significantly above the first threshold temperature, in particular by at least 20° C., and optionally above the second threshold temperature, a conscious control action, in particular an error acknowledgement, has to be undertaken by an operator of the charging connection device first of all before the interruption of the charging operation is reversed again.

5. The method according to claim 1, wherein the at least one temperature sensor continuously detects the at least one temperature value in the interior of the housing in the region of a circuit board, which circuit board supports at least a majority of the electrical and electronic components of the charging connection device, and the at least one temperature sensor is preferably positioned adjacent to a central control unit of the charging connection device, which central control unit controls the other electrical and electronic components and communicates with them.

6. The method according to claim 1, wherein a reduction of the maximum permissible charging current or an interruption of the charging operation is signaled to an operator of the charging connection device by an acoustic, a visual and/or a computer signal.

7. The method according to claim 1, wherein the respective threshold temperature of the at least one temperature value is determined by one or more reference measurements so that below the respective threshold temperature, the permissible maximum operating temperatures of selected electrical and electronic components of the charging connection device are not exceeded.

8. The method according to claim 1, wherein the at least one temperature value continuously detected by the at least one temperature sensor is subjected to a trend analysis so that the maximum permissible charging current can be reduced at an early stage or the charging operation can be interrupted at an early stage in the event of a critical result of the trend analysis and so that a reduction of the maximum permissible charging current or an interruption of the charging operation can be prevented or reversed at an early stage in the event of a non-critical result of the trend analysis.

9. The method according to claim 1, wherein the amount by which the maximum permissible charging current is decreased or optionally increased is determined and fixed on the basis of the current or optionally predicted degree of the rate of change, i.e. the speed of the temperature increase or temperature decrease, of the at least one temperature value in the vicinity of the first threshold temperature.

10. The method according to claim 1, wherein a venting unit of the charging connection device is activated in the event of a reduction of the maximum permissible charging current, in the event of an interruption of the charging operation and/or optionally in the event of a critical result of the trend analysis of the at least one temperature value.

11. The method according to claim 1, wherein at least one other temperature value is continuously detected at or in the at least one second interface of the charging connection device by at least one other temperature sensor and this at least one other temperature value is monitored to detect if at least one other threshold temperature has been exceeded.

12. The method according to claim 1, wherein several temperature values are continuously detected by several temperature sensors in the interior of the housing, preferably at different measuring positions.

13. The method according to claim 12, wherein another temperature value is continuously detected by another temperature sensor on or in a power supply, which power supply supplies at least the majority of the electrical and electronic components of the charging connection device with electrical energy, and if another threshold temperature of this other temperature value has been exceeded, the charging operation is terminated and the charging connection device is deactivated by switching off the power supply.

14. The method according to claim 1, wherein a log is kept of every time a threshold temperature has been exceeded and/or every time there has subsequently been a drop below it, preferably in conjunction with other operating events and in particular with an absolute or relative time stamp.

* * * * *